Sept. 26, 1939.  D. T. CRAFT  2,173,961
AUTOMOBILE AIR CONDITIONING DEVICE
Filed April 9, 1936  3 Sheets-Sheet 1
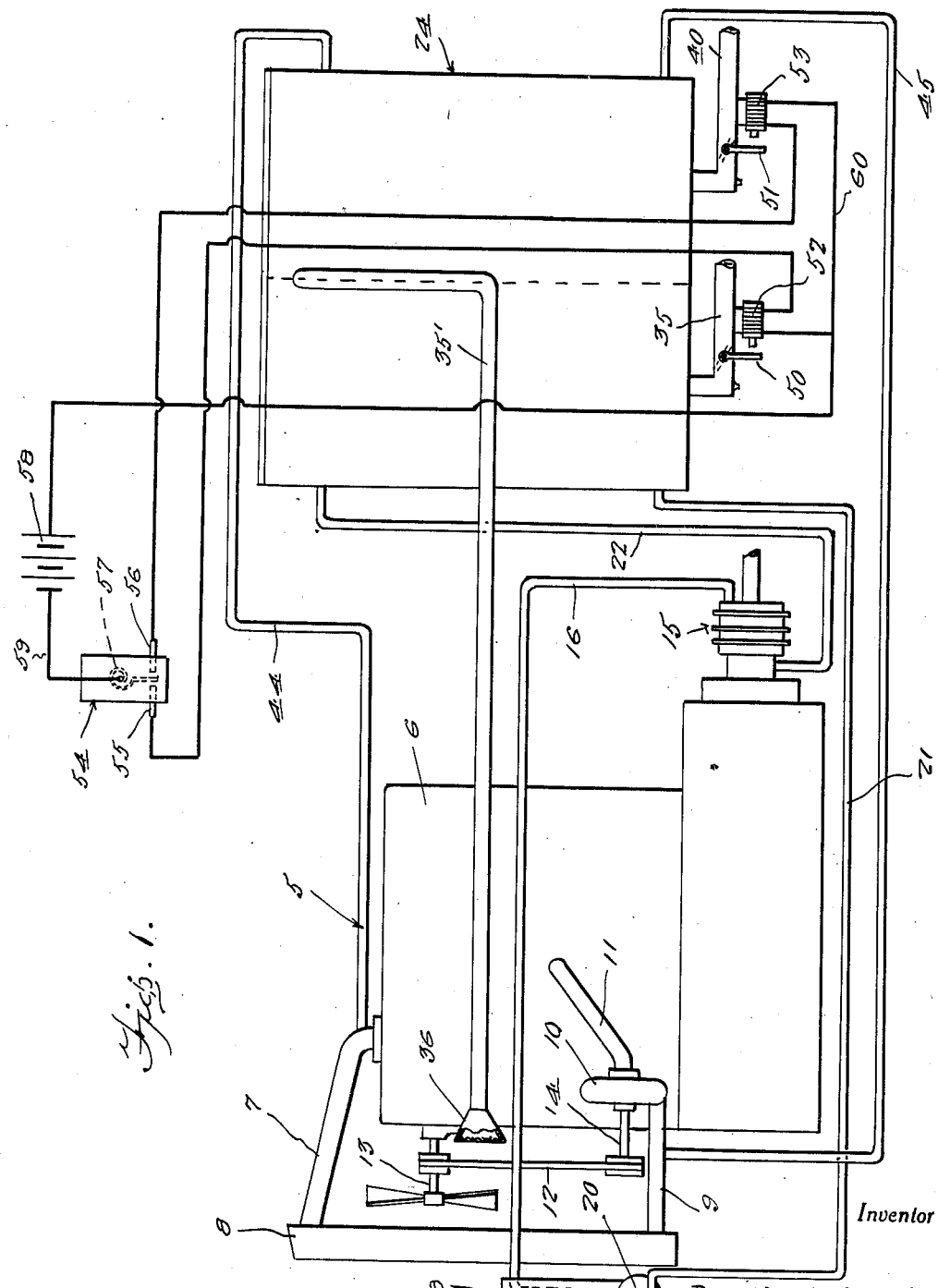
Inventor
David T. Craft
By Clarence A. O'Brien and
Hyman Berman
Attorneys Sept. 26, 1939.  D. T. CRAFT  2,173,961
AUTOMOBILE AIR CONDITIONING DEVICE
Filed April 9, 1936  3 Sheets-Sheet 2

Inventor
David T. Craft

Sept. 26, 1939. D. T. CRAFT 2,173,961
AUTOMOBILE AIR CONDITIONING DEVICE
Filed April 9, 1936 3 Sheets-Sheet 3
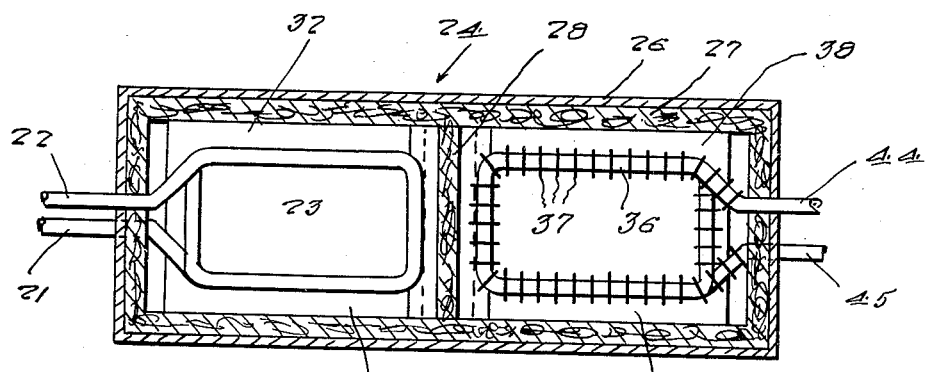
Fig. 3.
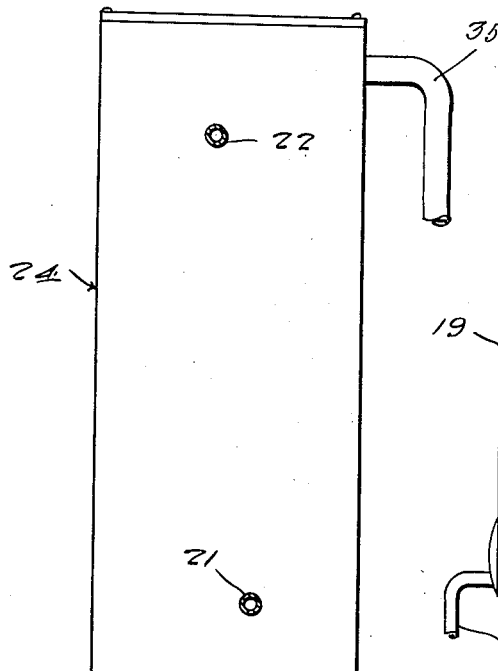
Fig. 4.
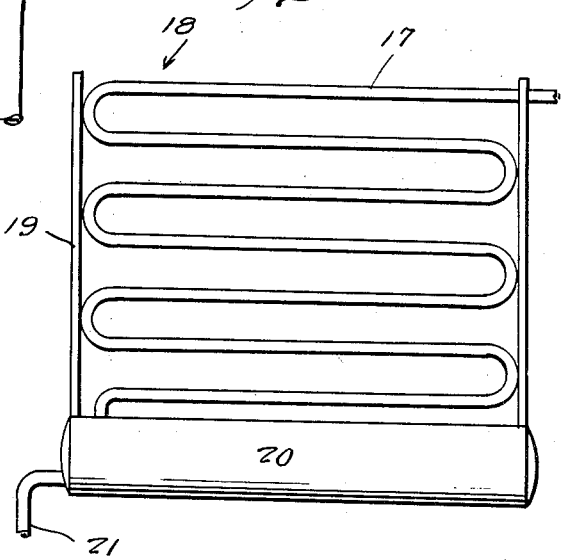
Fig. 6.
Inventor
David T. Craft
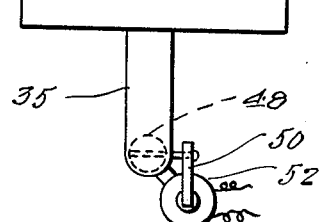
By Clarence A. O'Brien and
Hyman Berman
Attorneys Patented Sept. 26, 1939

2,173,961

UNITED STATES PATENT OFFICE 2,173,961

AUTOMOBILE AIR CONDITIONING DEVICE

David T. Craft, Norfolk, Va.

Application April 9, 1936, Serial No. 73,535

2 Claims. (Cl. 257—3)

My invention relates generally to means for heating or cooling and circulating the air within a closed automobile body, and particularly to a simple, efficient, and easily incorporated device of this character which employs operative features of the automobile engine already present, so as to operate at the lowest possible cost.

Another important object of my invention is to provide an air conditioning device of the character indicated which is thermostatically controlled so as to automatically maintain the desired temperature within the automobile body.

Other important objects of my invention will be apparent from a reading of the following description in connection with the drawings, wherein for purposes of illustration I have shown a preferred embodiment of my invention.

In the drawings:

Figure 1 is a general side elevational view showing an embodiment of the invention and its operative connections to the automobile cooling system and the automobile engine.

Figure 2 is a longitudinal vertical sectional view taken through the air cooling and air heating chamber.

Figure 3 is a horizontal sectional view taken through Figure 2 approximately on the line 3—3 and looking downwardly in the direction of the arrows.

Figure 4 is a front end elevational view of Figure 2.

Figure 5 is an enlarged longitudinal vertical sectional view taken through one of the conditioned air conduits and showing the electro-magnetically operated valve therein.

Figure 6 is an elevational view of the condenser showing the coil and the receiver thereof.

Referring in detail to the drawings, the numeral 5 generally designates the engine or motor of the automobile which includes the water jacket 6 from the top of which leads the discharge pipe 7 which connects with the upper end of the radiator 8, the lower end of which has a pipe 9 leading to one side of the cooling system water pump 10 which has its discharge side connected by means of a pipe 11 with the lower part of the water jacket. A belt 12 trained over pulleys on the fan shaft 13 and on the pump shaft 14 operates the pump 10.

A compressor of a suitable type, generally designated 15 is suitably mounted as indicated in Figure 1 on the lower part of the engine 5 in a manner to be driven by the engine at a suitable speed. The ouput side of the pump is connected by the pipe 16 to the upper end of the coil 17 of the condenser 18 which is mounted in front of the radiator 8. The condenser comprises a suitable frame 19 suitably connected for support to the front of the automobile in front of the radiator 8, between the side members of which frame the coil 17 has its loops horizontally arranged as shown in Figure 6, with the lowermost coil entering the top of the receiver 20 which is also supported on the said frame. The receiver discharges through a pipe 21.

The intake side of the compressor 15 is connected by means of the pipe 22 to the convolution of the cooling coil 23 which is contained in the heating and cooling chamber which is generally designated 24, while the lower end of this cooling coil 23 is connected by means of the pipe 21 with the receiver of the condenser 18.

The heating and cooling device or chamber 24 comprises a suitably shaped metallic box 26 which is lined with suitable insulating material as indicated by the numeral 27 and has therein a partition 28 dividing the chamber into a cooling compartment 29 and a heating compartment 30. The partition 28 stops below the top of the interior of the chamber 24 to meet the underside of a wire screen 31 which is stretched across the interior of the heating and cooling chamber so as to extend over both the cooling and heating chambers as indicated in Figure 2. The screen 31 is spaced below the top of the chamber.

The cooling compartment 29 contains the cooling coil 23 which is helical in form and vertically arranged and has projecting alternately from the front end of the chamber 24 and from the front side of the partition 28 the baffles 32 and 33 which extend horizontally between adjacent convolutions of the coil 23 so as to make a tortuous passage for the air which enters at the point 34 in the left hand side of the chamber by means of a fresh air conduit 35' which has its front end extended as indicated at 36 and which front end is located immediately behind the fan of the automobile engine.

The fresh air entering the port 34 above the screen 31 of the chamber 24 is cleaned by the screen before entering the compartments. The course of the fresh air is downwardly around the convolutions of the cooling coil 23 and around and along the baffles 32 and 33 until it reaches the lower end of the compartment 29 where it enters the cold air conduit 35.

The condenser 18 and the various pipes described as connected thereto and to the compressor and to the cooling coil 23, are arranged to contain a suitable standard refrigerant. The coil 17 of the condenser is arranged to be affected by the atmospheric air rushing thereagainst during the forward motion of the automobile.

The heating compartment 30 of the chamber 24 contains the vertically disposed helical heating coil 36 the convolutions of which have spaced cooling or heating fins 37 thereon. Baffles 38 and 39 alternately extending from the partition 28 and the back wall of the chamber 24 extend horizontally between adjacent convolutions of the heating coil 36 so as to provide a tortuous passage for the air entering the chamber by the port 34. The port 34 is located at the middle or center of the chamber so that the distribution of fresh air is equal to both of the compartments 29 and 30, the port being located immediately over the partition 28. In this downward travel around and along the heating coil 36 and along the baffles 38 and 39, the fresh air from the port 34 reaches the lower end of the heating compartment 30 and enters the hot air conduit 40. A spring pressed damper 41 supported on a bracket 42 controls the passage of heated air into the conduit 40, the spring 43 of the damper being of sufficient strength to prevent the movement into the conduit 40 of heated air from the compartment 30 until a sufficient volume of sufficiently heated air has accumulated in the compartment 30.

A pipe 44 leads from the top hose connection 7 of the water jacket of the engine to the upper convolution of the heating coil 36, while the lower end of the heating coil 36 is connected by means of a pipe 45 to the lower hose connection 9 of the cooling system of the engine. By means of this arrangement, hot water from the cooling system is automatically circulated through and in the heating coil 36 while the engine of the automobile is running.

Both the cooled air conduit 35 and the heated air conduit 40 have at their low points condensation drain means 46 and 47, respectively, and also respective valves 48 and 49 which include respective operating arms 50 and 51 which are of magnetizable material and have a portion located within the magnetic sphere of electro-magnets 52 and 53 which are fastened as indicated by the numeral 54 to portions of the conduits 35, 40, respectively. The operating arms 50 and 51 may be either gravitationally operated to the initial position in which the valves 48 and 49 are closed or a suitable spring-pressed arrangement (not shown) may be provided for the purpose. The electro-magnets 52 and 53 are adapted to be energized so as to act upon the arms 50 and 51 and open the valves 48 and 49.

Controlling the energization of the electro-magnets 52 and 53 is the two-way thermostatic switch which is generally designated 54 and which includes the contacts 55 and 56 and the thermostatically controlled contactor 57. The contact 55 relates to the cooled air conduit valve while the contact 56 relates to the heated air conduit valve. A suitable source of electrical energy 58, such as the battery of the automobile, has one side connected as indicated by the numeral 59 to the thermostatic contactor 57 and the opposite side of the battery is connected by a conduit 60 to one side of the solenoid 52 and a similar side of the solenoid 53. The remaining sides of the electro-magnets are connected respectively to the contacts 55 and 56. The thermostatic switch 54 will be located in the interior of the body of the automobile so as to be efficiently effected by the rise and fall of temperature therein, so that the heated air or cooled air conduits are turned "on" or turned "off" so as to either stop the supply of heated air to the interior of the automobile or to supply cooled air thereinto instead, and vice versa. The thermostat 54 has a middle or neutral position in which both the cooled air conduit and the heated air conduit are shut off.

While it is proposed that the cooled air conduit 35 shall discharge at the top of the interior of the automobile body, the precise location for the discharge is not nominated, several suitable arrangements being possible. Because of the tendency of the hot air to rise when released, the heated air conduit 40 is most appropriately placed with its discharge end in the floor or other lower part of the interior of the automobile body.

The condenser 18 is subject to location other than that specifically shown in the drawings and mentioned herein, the chief object of the placement thereof being to achieve efficient condensing of the refrigerant, plus convenient location on the automobile. Similar latitude is proposed in the placement of the heating and cooling chamber 24. Also the location of the control thermostat 54 is subject to variation and pleasure of the designer. It has already been noted that the compressor 15 might be of several different suitable types. It will be understood that the spring 43 of the automatic damper 41 will be of heat responsive material so as to fail to yield until a sufficiently high temperature of the heated air within the compartment 30 has been reached. A suitable supply of refrigerant for the refrigerant containing portions of the device is provided.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:

1. In combination, an automobile engine having a cooling system including a water jacket, a radiator, a top hose connection between the water jacket and the radiator, a bottom hose connection between the water jacket and the radiator, and a water pump interposed in said bottom hose connection; a compressor operatively connected to said engine, a refrigerating coil, a condenser including a receiver, pipes connecting said refrigerating coil, said condenser, and said compressor, an air cooling compartment containing said refrigerating coil, a fresh air feed for said compartment, a cooled air discharge for said compartment, an air heating compartment having a heated air discharge, a hot water air heating coil in said heating compartment, a third connection between one end of said air heating coil and said top hose connection, a fourth connection between the remaining end of the air heating coil and said bottom hose connection whereby hot water is circulated in the air heating coil by said water pump, said fresh air feed being connected also to said air heating compartment, the discharges of the air cooling compartment and of the air heating compartment each having therein an electromagnetically controlled shut-off valve, a source of electrical energy to which said valves are connected, and a two-way thermostatic switch located in the place to be heated and cooled by the air from said discharges, said switch being electrically interposed between the respective valves and said source.

2. In combination, an automobile engine having a cooling system including a water jacket, a radiator, a top hose connection between the water jacket and the radiator, a bottom hose connection between the water jacket and the radiator, and a water pump interposed in said bottom hose connection; a compressor operatively connected to said engine, a refrigerating coil, a condenser including a receiver, pipes connecting said refrigerating coil, said condenser, and said compressor, an air cooling compartment containing said refrigerating coil, a fresh air feed for said compartment, and a cooled air discharge for said compartment, an air heating compartment having a heated air discharge, a hot water air heating coil in said heating compartment, a third connection between one end of said air heating coil and said top hose connection, a fourth connection between the remaining end of the air heating coil and said bottom hose connection whereby hot water is circulated in the air heating coil by said water pump, said heated air discharge having therein an automatic normally closed thermostatic damper arranged to open only upon an accumulation of sufficiently heated air in the air heating compartment.

DAVID T. CRAFT.